June 15, 1965
W. J. FRANKTON
3,189,694
CARRIER CURRENT COMMUNICATION SYSTEMS
INCORPORATING REPEATERS
Filed Jan. 28, 1960
2 Sheets-Sheet 1

Inventor
W.J. FRANKTON
By C. H. Suydam
AGENT

June 15, 1965 W. J. FRANKTON 3,189,694

CARRIER CURRENT COMMUNICATION SYSTEMS INCORPORATING REPEATERS

Filed Jan. 28, 1960 2 Sheets-Sheet 2

Inventor
W.J. FRANKTON
By C. H. Sugdam
AGENT 3,189,694

CARRIER CURRENT COMMUNICATION SYSTEMS INCORPORATING REPEATERS

William Jesse Frankton, London, England, assignor to International Standard Electric Corporation, New York, N.Y.

Filed Jan. 28, 1960, Ser. No. 5,253
Claims priority, application Great Britain, Feb. 5, 1959, 4,061/59
7 Claims. (Cl. 179—175.31)

This invention relates to improvements in electric carrier current communication systems incorporating repeaters, with particular reference to supervisory and testing arrangements therefor.

In carrier current systems, particularly those operated over long submarine cables where submerged repeaters are used, it is very important that it should be possible to identify by tests from one or both of the terminal stations a particular defective repeater without any possibility of mistake, or to enable routine measurements of the repeater gain or other property to be readily carried out. In submarine cable systems this presents some difficulty because generally only one cable circuit is available for transmission in both directions, different frequency bands being of course used.

In British Patent No. 656,188, issued November 28, 1951, to F. O. Roe, a solution is offered based on the principle according to which each repeated is allotted one or more individual test frequencies by means of which unambiguous indication of the failure or deterioration of any repeater may be obtained. In this known system, the individual test frequencies are located in one transmission band (say E–W) and by frequency doubling (or dividing) in the respective repeaters, the second harmonic (or first sub-harmonic) of the outgoing test tone is returned in the other frequency band (W–E) to the originating station for supervision purposes.

There are inherent limitations in this arrangement, and in order to permit of more repeaters being included in the supervisory arrangements, it has been proposed to provide two groups of frequencies, say, of $m$ and $n$ frequencies respectively, each repeater being characterised by one of the $m$ frequencies and one of the $n$ frequencies, thus providing for $m \times n$ repeaters. The frequencies are caused to react in a modulator provided for the purpose in each repeater, and a selected side-band, which always falls within a specified range of frequencies, is returned to the sending station and provides a measure of the amplifier characteristics. A specified repeater noise-band is also measurable in this system by removing one of the test frequencies, and measuring the "white-noise" present at the output of the repeater in a representative band distinct from, or in the absence of, signals in the normal transmission band.

An objection to this arrangement is that the particular one of the frequencies to be applied to the modulator in the role of "carrier" must be at a satisfactory level for the purpose, which level is very high (say 10–16 db above reference level for the system). Thus the repeater being tested, and every other repeater along the cable, is obliged to carry an abnormally high level of test frequency, tending to overload the repeaters and giving rise to unpleasant secondary effects having possibly far-reaching consequences in the working channels of the system in the way of crosstalk and noise. Special provision must also be made in the main transmission path for restricting the noise band measured to one derived from the individual repeater being supervised, and excluding all other line noise coming from adjacent repeaters.

It is now proposed, according to the present invention, to adapt the second system described above in a way which obviates the disadvantages just outlined, and gives greater reliability, better allocation of test frequencies, and less interference with the normal working of the cable and its communication system. According to one embodiment of the invention, therefore, two single-frequency waves of different frequencies are transmitted from an attended station to a repeater to serve as test signals. In the repeater, the first test signal is passed through a frequency multiplier after amplification in the amplifier of the repeater, and a harmonic is selected which is again amplified in the amplifier, and is combined in a modulator with the second test signal. A modulation sideband is selected from the modulator and is returned to the attended station. The frequencies of the two test signals must of course be chosen to lie in the band used for transmission from the attended station, and also so that the frequency of the modulation sideband lies in the band used for reception by the attended station. One of the test signals has a frequency selected from a series of frequencies which are respectively characteristic of the repeaters of the system, the other test signal always having the same frequency. In this way a response may be obtained from any desired one of the repeaters. Preferably the test signal which is characteristic of a particular repeater should be the first test signal, which is the one which has a double amplification.

At the attended station, a comparison can be made between the levels of the transmitted test signal and the received modulation sideband so as to give a measure of the loop gain or loop loss to and from the selected repeater.

Further, repeater noise may be measured in a specified band for the individual repeater in the absence of the second test signal by selecting such a band and applying it to the modulator, and returning the products of modulation to the sending station. The noise band is preferably selected so as to give a modulation product in the same frequency band as that used for returned signals in the loop gain test; and moreover, by selecting the band in a part of the frequency spectrum where the cable is no longer equalised, noise from adjacent or other repeaters is effectively suppressed by the natural losses in the cable and does not appear in the repeater under test, so that any noise measurement made in respect of a specific repeater is of noise particular to that repeater alone and to no other, to a very large extent.

In the noise test according to the present invention, the first test signal, which has a frequency characteristic of the repeater being tested, acts after frequency multiplication as the "carrier" applied to the modulator, the noise band being the "signal." Since the noise is usually at a low level, it is desirable that the carrier should be at a high level, and this is the reason why it is preferable that the first test signal should be the one which is doubly amplified.

Moreover, a test for non-linearity in the amplifier of the repeater may be made by sending the second test signal or more than one of them through the system at a relatively high level so as to cause the production of harmonics and/or intermodulation products in the repeaters, a selected one of which may be returned to the testing terminal for level determination.

Before passing on to a description of an embodiment of the invention, it should be pointed out that the transmission path used for connecting the stations of the system may be any suitable communication medium, e.g., a cable circuit or audio connection over which signals may be electrically conveyed. Further, it will be understood that although the invention is mainly of interest in submarine cable transmission systems having submerged repeaters, exactly similar arrangements could be used on land lines or radio links having unattended repeaters which may be inconvenient of access. In such a case, much time would be saved by the regular routine testing of repeaters in the way outlined or by the facility of locating a defective repeater from the terminals by a loop test.

The invention will be described with reference to the accompanying drawings, in which.

Figures 1, 3:
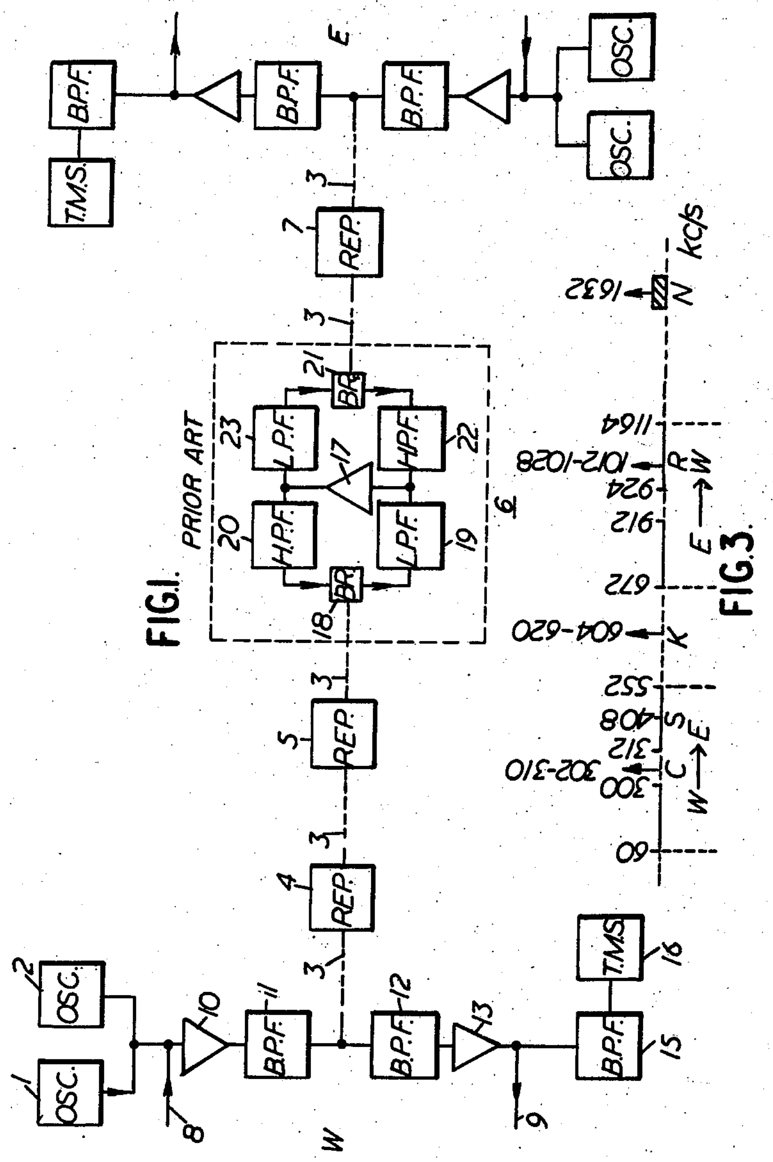
FIG. 1 shows a block schematic circuit of a two-way telecommunication system incorporating repeaters, to which the invention may be applied.
FIG. 3 shows frequency allocations of a 120-channel carrier current telecommunication system for use with FIG. 1.

FIG. 1 shows two terminals stations E, W, connected together over a submarine cable circuit 3, or any other type of circuit, over which is operated a two-way multichannel carrier current communication system. The system includes between the terminals any number of repeaters, of which only four are indicated, at 4, 5, 6, and 7. Details of repeater 6 only are given, and it will be understood that the other repeaters are similar.

It will be assumed that there are one hundred and twenty channels to be provided for in each direction between terminals E and W. Referring to FIG. 3, it will be seen that a frequency band from 60 to 552 kilocycles per second is used for transmisison from station W to station E, while a higher band from 672 to 1164 kilocycles per second is used for transmission in the opposite direction, from station E to station W, the channels in the two directions being arranged in two supergroups of 60 channels each, at 4 kilocycles per second spacing. It will be understood that the invention is not limited to this particular system, and there may be a different number of channels occupying different frequency bands.

At terminal station W, the usual carrier modulating and transmitting equipment (not shown) will be connected to conductor 8, and the usual receiving and demodulating equipment (also not shown) will be connected to conductor 9. Conductor 8 is connected to the outgoing circuit 3 through an amplifier 10 and a bandpass filter 11 designed to pass a band from 60 to 552 kilocycles per second, while the circuit 3 is connected to conductor 9 through a bandpass filter 12 designed to pass a band from 672 to 1164 kilocycles per second, and through an amplifier 13. The filters 11 and 12 could be low— and high—pass filters respectively, as will be described in connection with the repeaters. To the input of the amplifier 10 a pair of oscillators 1, 2 are connected, one of which (say, 1) is designed to supply a test signal of a fixed frequency of 408 kilocycles per second, while the other (2) is designed to supply a test signal of any one of a series of fixed frequencies, at choice, in the range 302 to 310 kilocycles per second, at suitable separations, a different one being allocated to each repeater. The frequencies supplied by oscillator 2 are chosen to lie in the dead frequency space between the two supergroups of channels which occupy the lower frequency transmission band for the W–E direction. The fixed frequency of 408 kilocycles per second is a system carrier frequency, and lies in the upper of these supergroup bands as reference to FIG. 3 will show. The separation between the frequencies from oscillator 2 will determine the number of unattended repeaters which can be accommodated in the supervisory arrangement, but this number is limited by the frequency separation which is necessary between adjacent filters which identify the individual repeaters, to prevent overlap. (These are the filters C1 in FIG. 2, to be referred to hereafter.)

The output of the amplifier 13 at terminal station W is connected to a band pass filter 15 designed to accept frequencies in the range 1012 to 1028 kilocycles per second, and thence to a transmission measuring set 16.

Similar arrangements can be provided at terminal station E for testing from that station, but clearly, the frequency allocations would need to be quite different, and might not be so convenient in practice.

The repeater 6 comprises a single amplifier 17 which amplifies the signals passing both ways. The cable 3 from the preceding repeater 5 is connected to a frequency selective bridge 18, one branch of which is connected through a low pass filter 19 to the input of the amplifier 17. The other branch is connected through a high pass filter 20 to the output of the amplifier. The cable 3 leading to the next repeater 7 is connected to a second frequency selective bridge 21, one branch of which is connected to the input of the amplifier 17 through a high pass filter 22, and the other branch is connected to the output of the amplifier through a low pass filter 23. The filters 19 and 23 should be designed to accept the lower frequency band of 60 to 552 kilocycles per second, and the filters 20 and 22 should be designed to accept the upper frequency band 672 to 1164 kilocycles per second. It will thus be seen that the signals transmitted from station W to station E pass over the path 18–19–17–23–21, while the signals transmitted in the opposite direction pass over the path 21–22–17–20–18. This arrangement is, of course, well known. The frequency selective bridge networks which are differently frequency-responsive in their respective arms, provide an alternative, superior in many respects, to the more familiar hybrid coil networks.

This simple form of two wire repeater is modified according to the invention in the manner shown in FIG. 2, to which reference will now be made.

Figure 2:
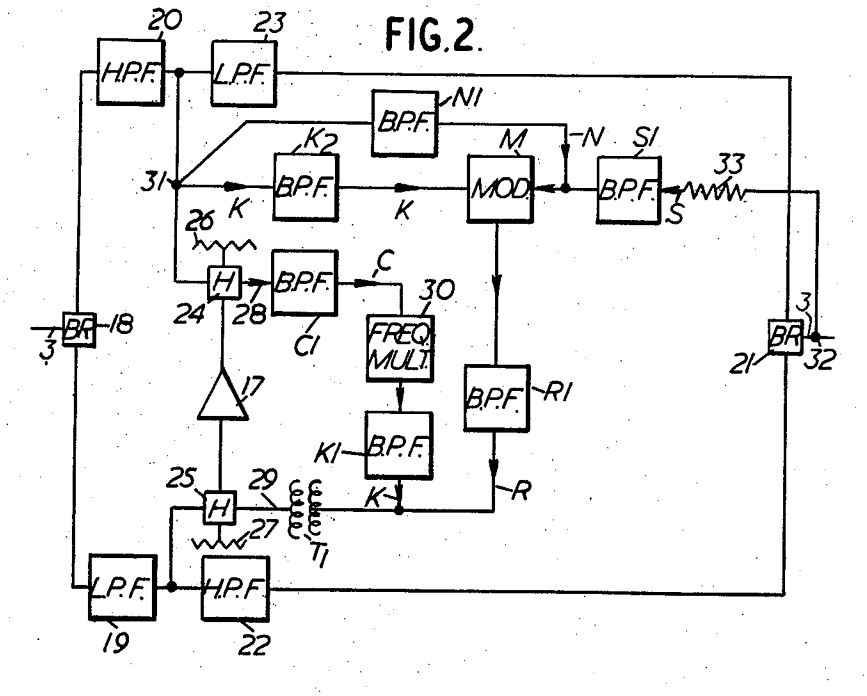
FIG. 2 shows details of a repeater of the system, incorporating the invention.

Elements of the basic repeater just described can be identified in FIG. 2 by corresponding references, and it will be observed that the amplifier 17 lies between two hybrid coil networks 24 and 25 which are of the "skew" variety, that is to say the transmission loss from the junction point of the filters 19 and 22 to the input of the amplifier 17, and from the output of the amplifier 17 to the junction point of filters 20 and 23 is in each case of the order of ½ db, while the transmission loss from conductor 29 to the input of the amplifier 17, and from the output of the amplifier 17 to conductor 28 is in each case of the order of 10 db. Elements 26 and 27 represent the usual balancing networks for the hybrid coils.

Conductor 28 is connected to conductor 29 by a loop circuit which includes a crystal band-pass filter C1, a frequency multiplier 30 which is provided for the purpose of generating harmonics of signals passing through the filter C1, and another band-pass filter K1, which need not be of the crystal type. The loop is completed through an impedance-matching transformer T1, which may in some cases not be necesary.

A larger lop around the amplifier 17 commences at point 31 in the main output path from the hybrid coil 24, and is returned to the junction between filter K1 and a transformer T1, and includes a band-pass filter K2, of similar type of K1, connected to the carrier input of a modulator M, and a further simple band-pass filter R1 for selecting a specified band of modulation products from the modulator M. Two paths S and N converge on to the signal input of the modulator M, path S starting from the east-bound cable 3 at point 32 and comprising a "pick-off" resistance 33 and a band-pass filter S1, while the other path N includes a band-pass filter N1 which is connected to the point 31 above mentioned.

A test signal of frequency appropriate to the repeater in question, lying within the range of 302 to 310 kc./s. and indicated in FIG. 2 by C, is applied at the West terminal, and at the repeater input is branched through the network 18 in the downward direction and passes through filter 19, being in the middle of the transmission band for that direction. This test signal is applied through the hybrid coil 25 to the amplifier 17 along with the channel signals and branches through the hybrid coil 24, appearing at the point 28 at a level of about —17 dbm, where it is selected from signals of all other frequencies present by the filter C1, and applied to the multipier 30 at a level of about −21 dbm.

The second harmonic is selected, at a level of about −33 dbm, by the filter K1, and applied through the transformer T1, and the hybrid coil 25, to the input of the amplifier 17. The frequency at this point will be in the range 604 to 620 kc./s., which is in the dead space between the frequency range used for the two directions of transmission. The frequency at the output of the filter K1 is designated K.

The test signal of frequency K at the output of the amplifier 17 is at a relatively high level on account of the slope of the gain-frequency characteristic of the amplifier, which favours the higher frequencies. The test signal is selected from the hybrid coil 24 at point 31 by the filter K2. Since the frequency of the test signal at this point is in the range of 604 to 620 kc./s., which is not accepted by either of the filters 20 or 23, the test signal will be at a relatively high level of about +7 dbm at this point, because both these filters present a high impedance in this frequency range. After passing through the filter K2, the level is reduced to about +3 dbm which is adequate for application to the modulator M, the test signal serving as the carrier wave for the modulator.

It should be noted that the high carrier level is produced in the repeater by a double amplification process, and this avoids transmitting the carrier from the west terminal over the cable at an excessively high level.

The fixed frequency test signal at 408 kc./s. supplied from the oscillator 1 at the west terminal (FIG. 1) is passed through the repeater along with the channel signals in the normal way, and emerges from the bridge network 21 on the cable 3 at the point 32 at a level of about −17 dbm. The fixed frequency test signal is selected by a narrow band-pass filter S1 and is applied to the signal input of the modulator M at a level of about −40 dbm, the relatively large loss occasioned here being due to the resistor 33, which is necessary to avoid a large bridging loss in the main transmission path. The test signal of 408 kc./s. reacts with the carrier test signal of frequency K in the modulator M to produce an upper side band which lies in the range 1012 to 1028 kc./s., which is in the frequency band for the return channels to terminal W. This frequency band is selected by filter R1 and passes through hybrid coil 25 to the main transmission path through the amplifier 17, hybrid coil 24, filter 20 and network 18 and then over the cable 3 back to terminal W. The level at the output of filter R1 is about −50 dbm which is adequate for measurement on the transmission measuring set 16 at terimnal W.

A loop circuit of known characteristic is thus set up for any specified repeater from terminal W over one transmission path through the selected repeater and back through the other transmission path, for supervisory purposes.

The filter N1 is designed to select a band of frequencies 100 kc./s. wide, and centred on 1632 kc./s. If the oscillator 1 at terimnal W (FIG. 1) is disconnected, the modulator M will receive a band of noise 100 kc./s. wide, selected from the output of the amplifier 17 at a level of about −69 dbm. This is about 30 db below that of the 408 kc./s. test signal, when it is present, so that it has no noticeable effect on measurements made with the test signal. In the absence of the test signal this band of noise modulates the carrier test signal in the modulator M and in this case the lower side band ( with respect to the noise signal frequency range) is selected and falls in the return frequency of 1012 to 1028 kc./s., and can thus be measured at terminal W in the same way as the previous signal was measured, but of course at a considerably lower level. It should be noted, however, that the frequency band passed by the filter R1 is only 16 kc./s. wide, and so the effective noise level is reduced by a further 8 db, since random noise energy is proportional to bandwidth.

It will be observed that the noise is selected from a part of the spectrum which is well above the highest frequency transmitted, namely, 1164 kc./s., and is thus in a part of the spectrum where the cable is no longer equalised and the amplifier gain is constant or is being reduced at a controlled rate. This means that the noise band selected is that due to the repeater in question alone and is not due, to any measurable extent, to similar noise generated by adjacent repeaters. This is an important point as it obviates the necessity for the introduction of stop filters for preventing noise from adjacent amplifiers in the selected band from reaching the repeater under test.

It should be pointed out that the filter N1 could alternatively be connected between the hybrid coil 24 and the filter C1, instead of to the point 31 as shown in FIG. 2, in which case the noise level applied to the modulator M will be about 10 db lower.

It should be mentioned that non-linear distortion and intermodulation in the amplifier 17 may be estimated by measuring the level of the second or third harmonic generated therein. For example, if a test signal of frequency 816 kc./s. be sent from the east terminal, this will pass through the repeated normally to the west terminal, but the second harmonic at 1632 kc./s. generated in the amplifier 17 will be selected by the noise filter N1, and after frequency change in the modulator M with the appropriate carrier test signal K in the range 604 to 620 kc./s. can be measured at the west terminal in the same way as the noise. Alternatively a test signal of frequency 544 kc./s. may be sent from the west terminal, the third harmonic of which at 1632 kc./s. passes through the filter N1 as before, and is measured at the west terminal. The test signal (i.e., of 816 kc./s. or 544 kc./s.) in this case would in general be sent at a relatively high level in order to create the most unfavourable conditions for the amplifier, and therefore a more sensitive test.

Additional information on the intermodulation may also be obtained by sending a carefully selected pair or even more of frequencies, and testing the generated level of a specific harmonic combination of these frequencies.

While the principles of the invention have been described above in connection with specific embodiments, and particular modifications thereof, it is to be clearly understood that this description is made only by way of example and not as a limitation on the scope of the invention.

What I claim is:

1. In a carrier current communication system for transmitting signals between a first station and a second station over a transmission line interconnecting said stations and including a plurality of serially related repeaters each having a separate indexing frequency assigned thereto, means in the first station for transmitting an indexing frequency and a test frequency over said line to a selected repeater having the corresponding indexing frequency assigned thereto, and means in the said selected repeater for responding to said transmitted frequencies to provide test information to said first station, the last-said means including means for amplifying said transmitted indexing frequency, means for frequency multiplying said amplified frequency, means for amplifying said multiplied frequency, means for modulating said amplified multiplied frequency with said transmitted test frequency, means for deriving a side band frequency of said modulated frequencies, and means for transmitting said side band frequency to said first station.

2. A carrier current communication system as set forth in claim 1 wherein the signals transmitted from the said first station to the said second station lie within a first direction frequency band and the signals transmitted in the other direction lie within a second direction frequency band and wherein the said test frequencies lie within the first direction frequency band and the said sideband frequencies lie within the second direction frequency band.

3. A carrier current communication system as set forth in claim 1 wherein the said signals transmitted between said station are amplified by the said means for amplifying the said indexing frequency.

4. A carrier current communication system as set forth in claim 1 wherein the signals transmitted from the said first station to the said second station lie within a first direction frequency band comprising two narrower and separated frequency bands and wherein the said indexing frequencies lie within the frequency band between the said narrower frequency bands.

5. A carrier current communication system as set forth in claim 1 wherein the signals transmitted from the said first station to the said second station lie within a first direction frequency band and the signals transmitted in the other direction lie within a second direction frequency band separated from the first direction frequency band and wherein the said multiplied frequency lies in the frequency band between said first and second direction frequency bands.

6. A carrier current communication system as set forth in claim 5 wherein said test frequency comprises noise signals lying a frequency higher than the frequencies in said first and second direction frequency bands.

7. A carrier current communication system as set forth in claim 6 wherein said side band frequency transmitted to said first station is the lower side band of said modulated frequencies.

References Cited by the Examiner

UNITED STATES PATENTS

| | | | |
|---|---|---|---|
| 2,315,434 | 3/43 | Leibe | 179—175.31 |
| 2,432,214 | 12/47 | Sontheimer | 179—175.31 |

FOREIGN PATENTS

| | | |
|---|---|---|
| 1,091,841 | 11/54 | France. |
| 656,188 | 8/51 | Great Britain. |

ROBERT H. ROSE, *Primary Examiner.*

L. MILLER ANDRUS, *Examiner.*